R. P. BRADLEY.
Sheep Shears.
No. 16,461.
Patented Jan. 27, 1857.
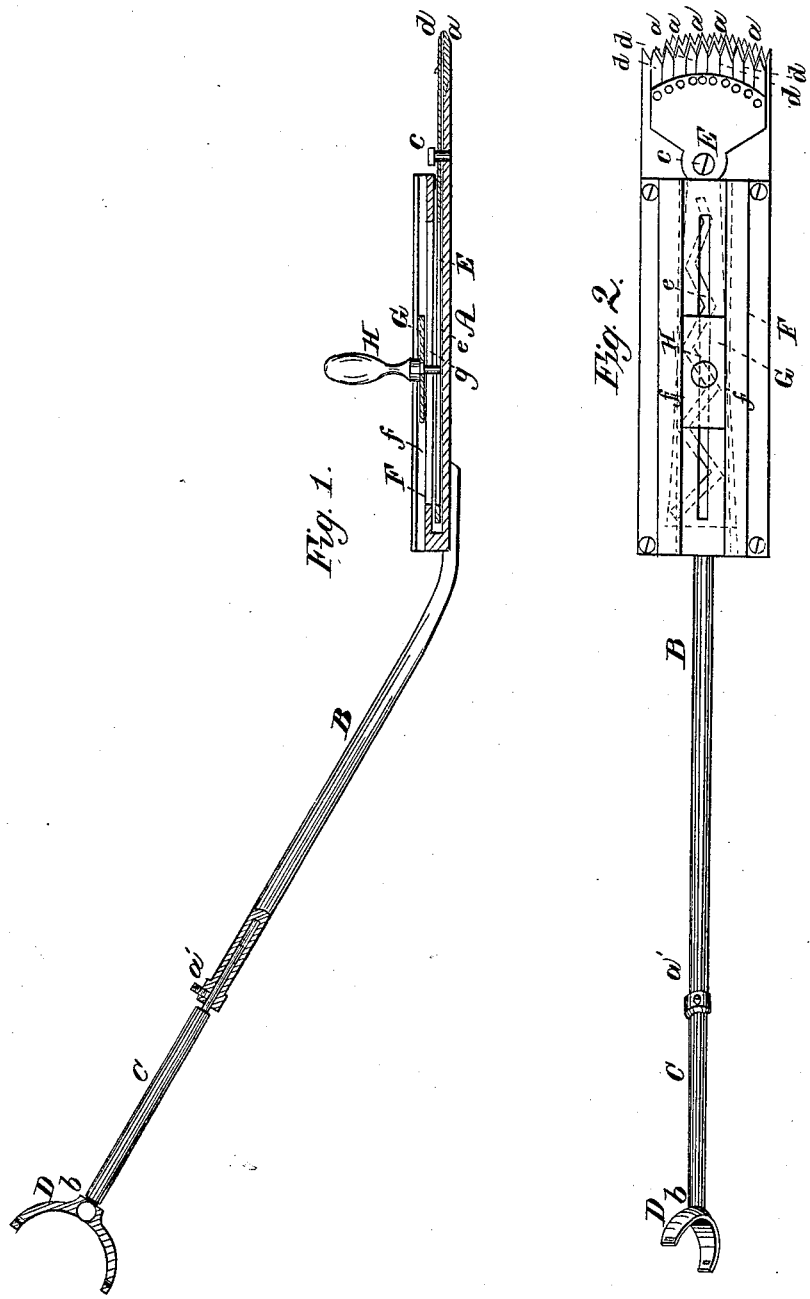

UNITED STATES PATENT OFFICE.

R. P. BRADLEY, OF CUYAHOGA FALLS, OHIO.

MACHINE FOR SHEARING SHEEP.

Specification of Letters Patent No. 16,461, dated January 27, 1857.

*To all whom it may concern:*

Be it known that I, R. P. BRADLEY, of Cuyahoga Falls, in the county of Summit and State of Ohio, have invented a new and Improved Device for Shearing Sheep; and I do hereby declare that the following is a full, clear, and exact description of the same, reference being had to the annexed drawings, making a part of this specification, in which—

Figure 1, is a longitudinal section of my improvement, the plane of section being through the center. Fig. 2, is a plan or top view of ditto.

Similar letters of reference indicate corresponding parts in the two figures.

My invention consists in increasing the length of the zigzags of the slot in the lever which carries the cutting apparatus as they recede from the fulcrum so as to give the opposite end of the lever which carries the teeth or blades a uniform and equal motion.

To enable those skilled in the art to fully understand and construct my invention, I will proceed to describe it.

A, represents the bottom plate of the device. This plate may be constructed of metal of a suitable width and length, the outer end of the plate having a series of saw-shaped teeth or fingers $(a)$, attached to it. The inner end of the plate A, is attached to a tube B, which has a rod C, fitted in its upper end. The upper end of the rod C, has a shoulder piece D, attached to it by a universal joint. The tube B, is bent at its junction with the plate A, so that it will incline upward at an angle of about 40°, as shown in Fig. 1.

E, represents a lever which is pivoted to the upper surface of the plate A, at $(c)$. The outer end of this lever has a series of saw shaped teeth $(d)$, attached to it, and these teeth work over the teeth or fingers $(a)$. The lever E, has a zig-zag slot $(e)$, cut through it as shown clearly in Fig. 2. The angles of this slot become gradually more acute as it recedes from the fulcrum of the lever and the length of the zig-zags also gradually increase in length in the same direction, as shown clearly in Fig. 2, so as to give the opposite end of the lever which carries the teeth or blades a uniform and equal motion.

F, represents a plate which is secured over the lever E, and plate A. The upper surface of the plate F, has two guides $(f)$, $(f)$, placed longitudinally upon it, and a plate G, is fitted between these guides and allowed to work freely between them. A handle H, is attached to the plate G, and a pin $(g)$, which is attached to the lower end of the handle projects below the plate F, and passes into the slot $(e)$, the plate F, being slotted longitudinally to allow the pin $(g)$, to work through it.

The implement is used in the following manner. The shoulder piece D, is secured to the shoulder of the operator by straps and the device is fed into the wool by inclining the body forward and back; the operator grasps firmly the handle H, with the hand of the same arm to which the shoulder piece is secured, thereby giving him the entire control of the machine to raise or fall, roll it to right or left, and also to move the plate G back and forth, thereby producing the vibrating motion of the cutters $d$, leaving the other arm of the operator entirely free to handle the sheep. The pin $g$, as it moves back and forth in the slot $e$, communicates a vibrating motion to the lever E, and the teeth $d$, are vibrated over the teeth or fingers $a$, the wool being cut between the teeth which operate similar to shears; the lever E, has an equal movement, or its length of vibration is always the same in consequence of the varying angles and lengths of the zig-zags of the slots. The implement may be moved in any direction, and the tube B may be moved farther in or out on the rod C, and secured at any desired point by a set-screw $a^1$.

The implement is simple, may be cheaply constructed, and will operate rapidly and well.

I believe I have described and represented my invention and improvement, so as to enable any person skilled in the art to make and use it. I will now state what I desire to secure by Letters Patent.

I claim—

Increasing the length of the zig-zags of the slot $(e)$ in the lever E as they recede from its fulcrum so as to give the opposite end of the lever which carries the teeth or blades $(d)$ a uniform and equal motion as the pin is traversed in the slot substantially as described.

R. P. BRADLEY.

Witnesses:
I. S. HOLLOWAY,
W. F. HOLLOWAY.